United States Patent [19]

Gillet

[11] Patent Number: 5,012,565

[45] Date of Patent: May 7, 1991

[54] METHOD FOR THE MANUFACTURE OF LAYERED CAPACITORS HAVING A THICKNESS OF INACTIVE LAYERS

[75] Inventor: Robert Gillet, Seurre, France

[73] Assignee: Compagnie Europeenne de Composants Electroniques LCC, Courbevoie, France

[21] Appl. No.: 454,207

[22] Filed: Dec. 21, 1989

[30] Foreign Application Priority Data

Dec. 23, 1988 [FR] France .................................. 88 17086

[51] Int. Cl.$^5$ .............................................. H01G 4/30
[52] U.S. Cl. ..................................... 29/25.42; 242/56.1
[58] Field of Search ...................... 29/25.42; 242/56.1; 361/323, 324

[56] References Cited

U.S. PATENT DOCUMENTS 4,229,865 10/1980 Fanning .............................. 29/25.42
4,633,551 1/1987 Bernard .............................. 29/25.42

Primary Examiner—Carl E. Hall
Attorney, Agent, or Firm—Pollock, VandeSande & Priddy

[57] ABSTRACT

Metallized dielectric film is employed to manufacture capacitors. In order to attach a certain number of inactive layers to the capacitors, the method comprises a stage which consists in displacing the layers laterally during the winding operation in order to obtain a determined thickness of inactive layers, the lateral displacement causing the prevention of the connection of the metallizations of the films to the lateral Schoop coatings.

3 Claims, 2 Drawing Sheets

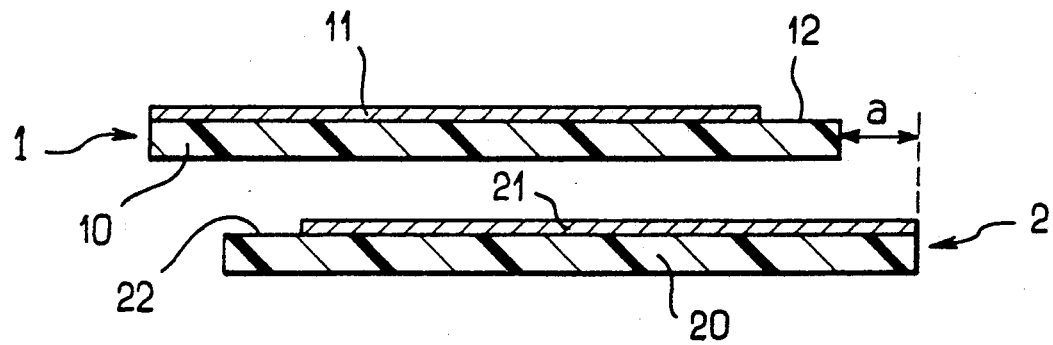
FIG_1
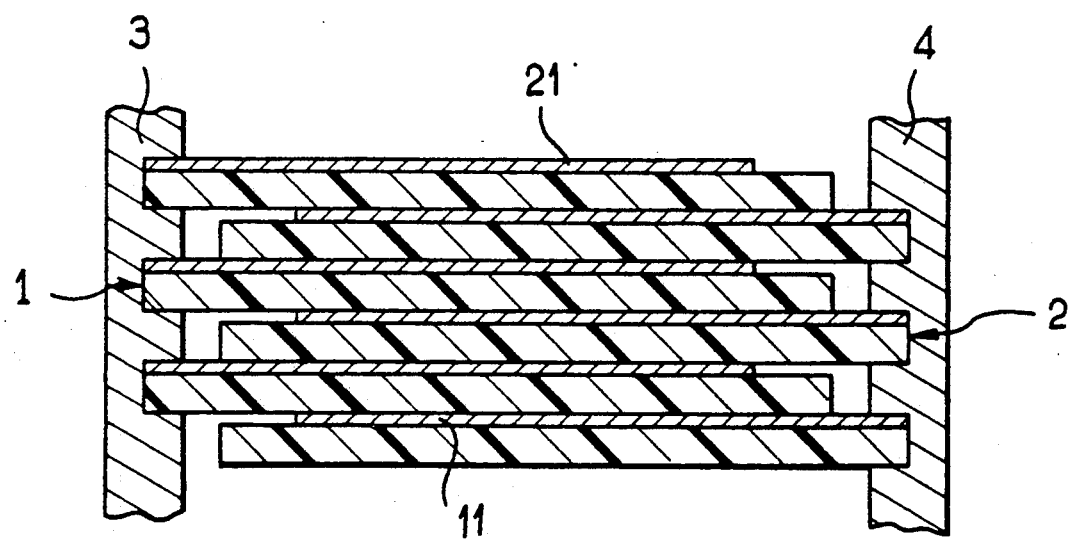
FIG_2

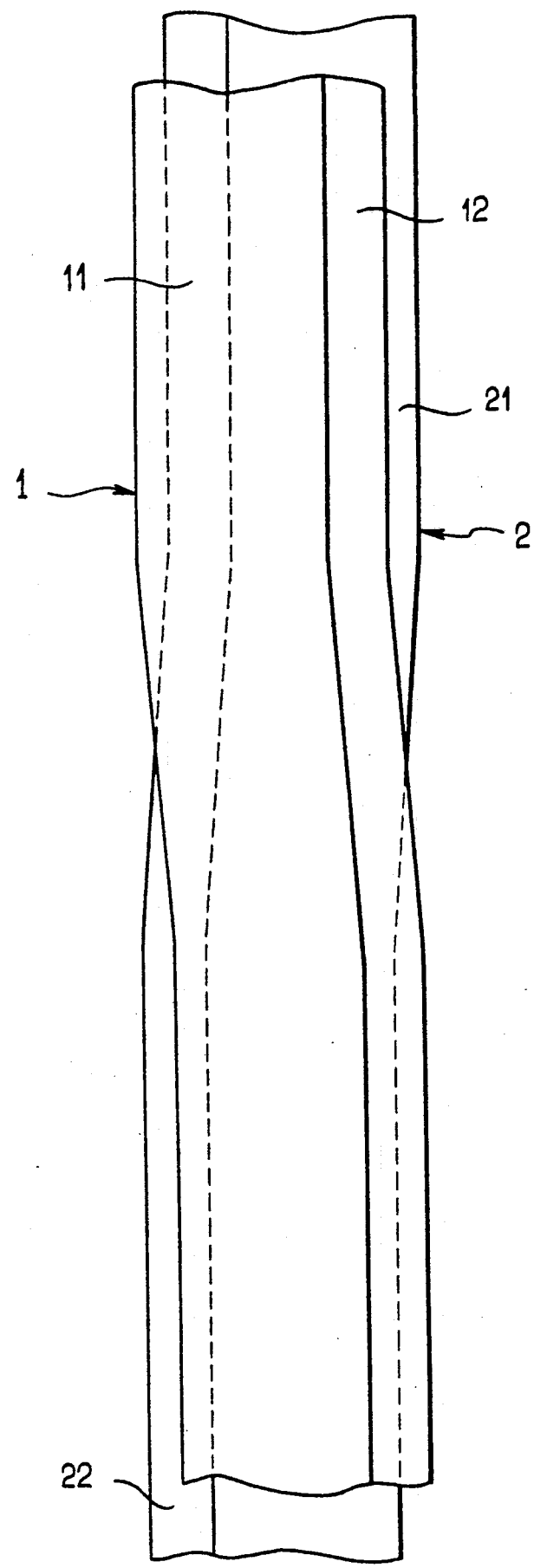
FIG_3

METHOD FOR THE MANUFACTURE OF LAYERED CAPACITORS HAVING A THICKNESS OF INACTIVE LAYERS

BACKGROUND OF THE INVENTION

1. Field of the invention

The present invention relates to a method for manufacturing layered capacitors having a thickness of inactive layers.

2. Description of the Prior Art

For various reasons (electrical or physical insulation, protection, preserving a stack), it is sometimes necessary, during the manufacture of a layered capacitor, to wind a certain thickness of inactive layers This has come to light with the technology now currently used for winding metallized dielectric films onto a wheel with a large diameter. The films are, for example, metallized on one face, except for a lateral margin. In order to obtain a mother capacitor, it is then possible to wind two of these films onto a wheel in order to form a stack, the margins being alternated and a lateral projection of the metallized parts being provided in the stack produced. The component capacitors consisting of a dielectric film between two metallizations are combined in parallel by metallization or Schoop-coating of the lateral faces of the stack.

If it is desired to wind a certain number of inactive layers about these two layers, which will form the active parts of capacitors, various procedures are possible at present.

The technique of demetallizing a plastic film coated with a metal layer (which is generally aluminum in the case of capacitors) under the influence of an electric arc is known. This method is widespread. A major disadvantage of it is that it rapidly contaminates the demetallizing system.

The technique which consists in inserting, during the winding, layers of non-metallized, and therefore non-active films is also known. This method is poorly compatible with high-speed production and in particular with winding onto a wheel with a large diameter. Indeed, it requires stopping the winding machine and frequent manual interventions.

In order to overcome these disadvantages, the invention provides a novel method which has the advantage of producing a winding of inactive turns with no demetallization, without stopping the machine and with no spontaneous breaks of the film. This winding of inactive turns is obtained from films used for producing the active parts of the capacitors and as a result of a lateral displacement operation without stopping the winding operation.

SUMMARY OF THE INVENTION

The subject of the invention is therefore a method for manufacturing capacitors from layers of dielectric film and conductive foils, the method comprising a winding stage, either to provide a wound capacitor directly or, on a wheel with a large diameter, to provide stacked capacitors, the winding being carried out such that the conductive foils can subsequently be temporarily connected in order to obtain the capacitive effect, the method also comprising a stage of metallizing the sides of the coil produced, in order to provide the electrodes of the capacitors, the metallization causing the foils, which correspond to the same electrode, to be connected electrically, the method furthermore comprising a stage consisting in displacing the layers laterally during the winding operation in order to obtain a determined thickness of inactive layers, the lateral displacement causing the prevention of the connection of the conductive foils to the electrodes.

BRIEF DESCRIPTION OF THE DRAWINGS

The invention will be better understood and other advantages will emerge, as a result of the description below, given by way of non-limiting example and accompanied by the attached drawings in which:

FIG. 1 shows the arrangement of two layers during the operation of winding layered capacitors, FIG. 2 shows the structure of a coil obtained by winding capacitive layers, FIG. 3 illustrates the operation of laterally displacing the capacitive layers according to the invention.

DESCRIPTION OF THE PREFERRED EMBODIMENTS

The method according to the invention will be described in more detail in its application to the manufacture of capacitors of the stacked type, obtained by winding dielectric film metallized on one face onto a wheel with a large diameter. This technology is, in fact, currently very widespread. However, the method according to the invention may also be applied to other applications. Still in the case of winding onto a wheel with a large diameter, the case of capacitors obtained by winding films metallized on both faces with margins on the same side, the case in which the dielectric films are not metallized and in which the foils are themselves metal films wound at the same time as the dielectric films may be mentioned. The technology of manufacturing capacitors by individual winding may also be mentioned.

The attached figures therefore refer to the general case of winding dielectric films metallized on one face onto a wheel with a large diameter.

FIG. 1 shows, in section the arrangement of two layers 1 and 2, each consisting of a dielectric film 10 and 20 and a metallization 11 and 21 acting as a conductive foil respectively, during winding. The metallizations do not entirely cover the films: lateral margins 12 and 22 remain It can also be seen that the winding is carried out by providing a projection a in the coil. As FIG. 1 shows, the metallized parts of the films project laterally from the coil. This arrangement is well known to a person skilled in the art.

FIG. 2 shows, in section, the result obtained after a few turns of the winding wheel. The coil consists of alternating layers 1 and 2. By metallizing the sides of the coil, or Schoop-coating, parallelism is obtained of all the component capacitors formed by each dielectric film between the conductive foils which form the metallized parts. The consecutive projection a in the winding enables a good electrical connection between the metallizations 3 and 4 of the sides of the coil and the conductive foils, 11 and 21 respectively. After the mother capacitor obtained on the winding wheel has been cut off, the metallizations 3 and 4 will form the electrodes for elementary capacitive stages.

FIG. 3 illustrates the stage of the method according to the invention which enables an inactive part to be obtained in the coil. The layers 1 and 2 have this time been shown seen from above. Their metallized parts 11 and 21 and their margins 12 and 22 can be discerned. The upper part of the figure shows the usual arrangement of the films relative to each other for producing the active part of the capacitors. The metallized parts 11 and 21 project from the coil and they will be electrically connected to their corresponding lateral metallization. In the median part of the figure, the operation of laterally displacing the layers 1 and 2, carried out during the winding, has been shown. This lateral displacement leads to the situation shown at the bottom of the figure where it can be seen that it is now the margins 12 and 22 which project from the coil. It will no longer be possible for the metallized parts 11 and 21 to be connected by the lateral metallizations. A determined thickness of inactive layers can thus be obtained. Normal winding can be resumed by reversing the direction of the lateral displacement of the layers 1 and 2.

In FIG. 3, it is the two layers which have been displaced laterally, but it would be possible to arrange for one or the other of the layers to be displaced laterally.

The lateral displacement of the layers may take place in a very short time. It is advantageous to make use of the system for guiding the layers to be wound, existing in winding machines, in order to bring about this lateral displacement. Since this guiding system is very accurate, it will be easy to control the amplitude of the desired lateral displacement. Furthermore, this is a system which already exists in the machines and only slight modifications need to be made to the machines in order to implement the invention.

The lateral displacement may be obtained by an electromechanical control device of the system for guiding the films. The control device may be integrated into the electronics of the machine and realized by all types of electromechanical systems known at present.

The invention enables the edges of the films to be reversed at a very high speed without impairing the electrical qualities of the capacitors.

Although it employs as the non-active material metallized films which are in themselves expensive, the entire advantage of the method according to the invention lies in a stacked winding onto a wheel with a large diameter where the spontaneous breaking of the films is a major disadvantage.

In the above-described example, it is the metallized dielectric films which are displaced. In other applications of the invention, it may be, depending on the circumstances, dielectric films which are non-metallized, or conversely metallized on both sides, metal films acting as conductive foils, etc. The principle is to render certain layers inactive by preventing the connection of the conductive foils to the electrodes.

I claim:

1. A method for manufacturing capacitors from two overlying strips, each strip having a layer of dielectric film contacting a conductive foil along a lateral edge;

winding a plurality of turns of the overlying strips to form a wound body to provide a mother capacitor from which stacked capacitors are formed, edges of the conductive foil being exposed at respective axial ends of the wound body;

during winding periodically laterally displacing one strip relative to the other to relocate the lateral edges of each strip relative to the other such that winding turns formed during the displacement have no exposed foil edges; and metallizing the axial ends of the wound body to form electrodes by electrically connecting the exposed edges of the conductive foil, electrical connection not occurring along the lateral edges of the displaced strips which form a thickness of inactive layers.

2. The method set forth in claim 1 wherein a preselected thickness of inactive layers is formed by displacing one strip relative to the other for a corresponding interval during winding.

3. The method set forth in claim 1 or 2 wherein said winding and displacing steps are performed by machine.

* * * * *